Sept. 6, 1955   H. L. SMITH   2,716,939
BASKET STRAINER FOR PORTABLE DEEP FAT FRYING APPARATUS
Filed Dec. 10, 1951   2 Sheets-Sheet 1

INVENTOR
HARRY L. SMITH

BY Gustave Miller
ATTORNEY

Sept. 6, 1955 H. L. SMITH 2,716,939
BASKET STRAINER FOR PORTABLE DEEP FAT FRYING APPARATUS
Filed Dec. 10, 1951 2 Sheets-Sheet 2
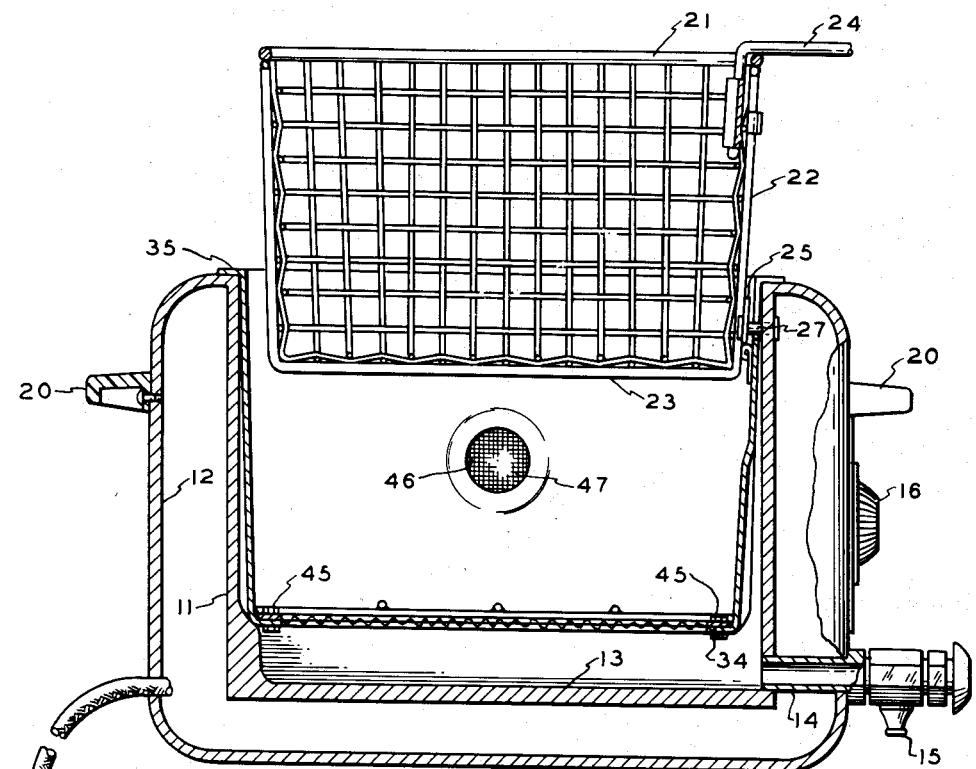
Fig. 2
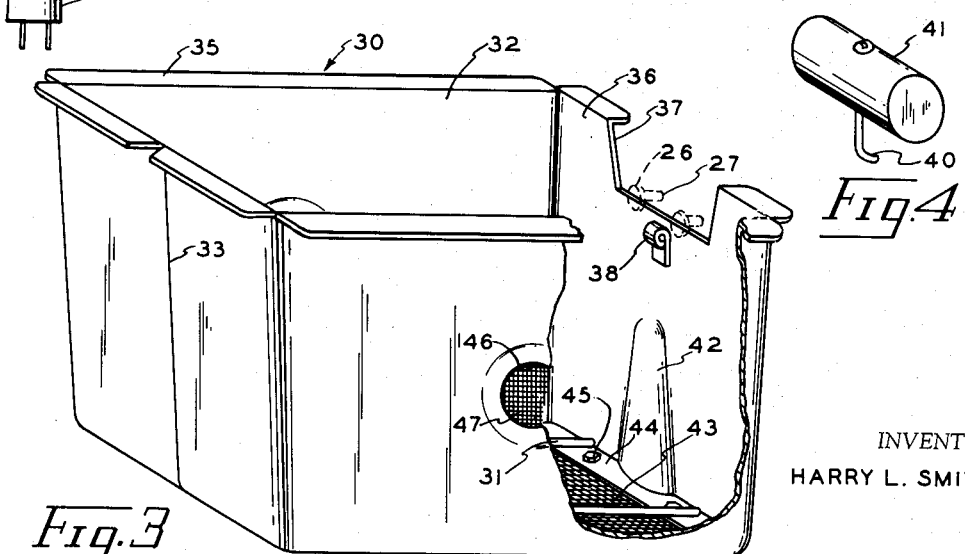
Fig. 3
Fig. 4
INVENTOR
HARRY L. SMITH
BY Gustave Miller
ATTORNEY A# United States Patent Office 2,716,939
Patented Sept. 6, 1955

2,716,939
BASKET STRAINER FOR PORTABLE DEEP FAT FRYING APPARATUS

Harry L. Smith, Lake Waccamaw, N. C.

Application December 10, 1951, Serial No. 260,849

3 Claims. (Cl. 99—408)

This invention relates to a strainer basket for portable deep fat frying apparatus, wherein the deep fat frying apparatus is of the nature that is usually used in the home kitchen, but the principles of this invention may be equally applied to non-portable deep fat frying apparatus such as used in restaurants and commercial institutions.

It is an object of this invention to provide a strainer basket for use in a deep fat frying apparatus wherein food such as French fried potatoes, chickens, oysters, onions, etc., are fried in deep fat and wherein it is desired to keep the fat free from contamination by any food particles or materials that may drop off the food into the fat to either contaminate the fat per se or to descend through the fat to that part of the apparatus where the heat is applied to the fat and thus be broken down by the heat into fat contaminating materials.

With this invention, the fat may be kept free of heat produced contamination and may be periodically freed of food particles so completely that the same fat used in frying one type of food may be used in frying a different type of food without any contamination thereof. With the use of this invention it has been found that fat that has been used for frying onions, for instance, may be so completely cleared of any possible contamination from the onions that it may be used for frying any other type of food such as chicken, for instance, without imparting any onion taste or flavor whatsoever to the fried chicken.

A further object of this invention is to provide a means for preventing any food particles or other materials from reaching or touching the heating surfaces of the deep fat frying apparatus to thus prevent any contamination of the fat by overheated food particles.

Still a further object of this invention is to provide a basket strainer particularly intended for any home type of deep fat frying apparatus and may be made in various sizes, shapes and dimensions to fit any particular home type of deep fat frying apparatus, but may likewise be made to fit any other type of deep fat frying apparatus.

Still a further object of this invention is to provide a strainer basket for a deep fat frying apparatus which is an improvement over that shown in applicant's co-pending application, Serial No. 225,208, filed May 8, 1951.

Still a further object of this invention is to provide an improved basket strainer which prevents any possibility of food particles or contamination from contacting the heating surfaces to be broken down and contaminate the fat yet which permits ready and proper circulation of the heated fat to the food in the frying basket.

Still a further object of this invention is to provide a strainer basket which may be removed whenever desired and which when removed while the fat is in a heated condition serves to thoroughly strain the fat by the very act of removal of the basket whereupon the strainer may be cleansed and then replaced to continue to serve its function of preventing contamination of the fat.

Still a further object of this invention is to provide a strainer basket for keeping the fat or oil free of contamination which may be easily and readily removed while the fat is still in heated condition so that the fat when drained from the frying apparatus for storage, as customary in home usage, will be free of contamination and may be used again on any type of food without carrying any contamination thereto.

With the foregoing and other objects in view, this invention comprises the combination, construction and arrangement of parts hereinafter set forth, claimed and disclosed in the accompanying drawings, wherein:

Fig. 2 is a sectional view on a vertical plane extending longitudinally of Fig. 1.

Fig. 3 is a perspective view partly broken away of the strainer basket of this invention.

Fig. 4 is a perspective view of a removing tool.

Figure 1:
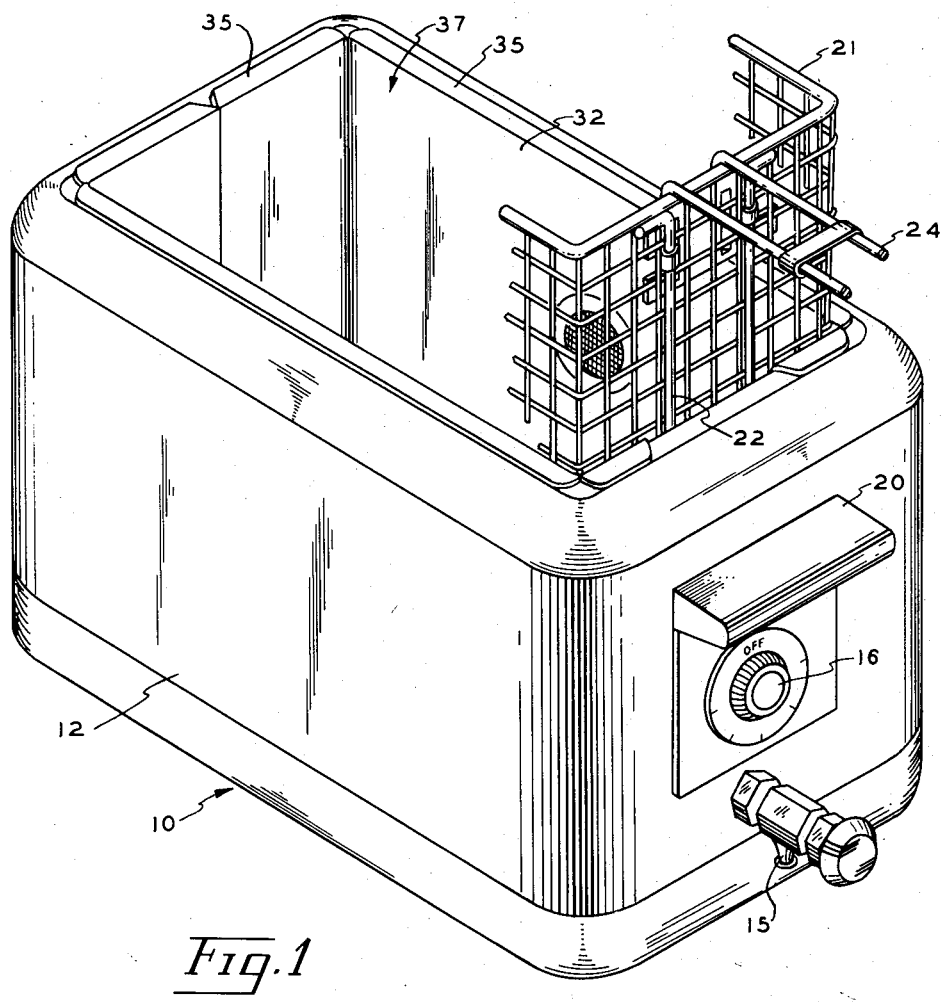
Fig. 1 is a perspective view showing the strainer basket of this invention in operative position in a home type deep fat frying apparatus.

There is shown at 10 a representation of a conventional type of portable home kitchen style of deep fat frying apparatus having its usual inner oil or grease well 11 spaced from the outer walls 12 and its usual drain sump 13 at the bottom of the well 11 leading to the drain pipe 14 and faucet spout 15 for draining off the frying fat or oil for storage when not in use. The apparatus 10 is also provided with the customary rheostat and on-off switch 16 for controlling a heating element located between the inner well 11 and the outer wall 12 (but not shown) and receiving its electrical current from the conductor 17 and plug 18. Usual handles 20 are provided at the front and back ends for carrying the apparatus when necessary. The apparatus also includes the usual grid food basket 21 with the usual pair of reinforcing ribs 22 extending thereabout, although the under portion of the ribs 23 remains snug along the bottom of the food basket 21 instead of having the customary depending leg portions to extend into the sump 13.

The basket 21 also has its conventional detachable handle 24 and the usual slotted supporting plate 25 for cooperating with the heads 26 of the supporting pins 27 in one upper end of the well 11 for supporting the basket 21 while in raised position to allow the heated oil or grease to drain from the food basket 21 back into the well 11.

All of the structure thus far described, except for the lower basket ribs 23 is conventional and not a part of this invention per se.

Figure 5:
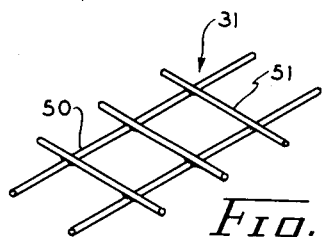
Fig. 5 is a perspective view of a grid for supporting the food basket within the strainer basket.

This invention consists principally in the strainer basket 30 and the removable food basket supporting grid 31 shown separately in Figs. 3 and 5 and shown in operative position within the well 11 of the frying apparatus 10 in Figs. 1 and 2.

This strainer basket 30 as shown, has its side walls 32 made from a continuous sheet of suitable metal, suitably shaped and folded and having its edges welded or otherwise sealed together as at 33. The lower edges of the side walls 32 are turned in a slight amount to provide a suitable supporting flange 34, the corners of such flange 34 being suitably welded or otherwise sealed together.

At the top of the side walls 32 the sheet of metal is turned outwardly to provide supporting flanges 35 which project outwardly far enough so as to support the strainer basket 30 on the top edge of the inner well 11 of the frying apparatus 10 as shown in Figs. 1 and 2. The front wall 36 of the strainer basket 35 is cut away at 37 to a point just below the headed supporting pins 27 and just below the cutaway 37 at the center thereof it is provided with an integrally secured eye or loop 38 for cooperation with a hook end 40 of a removing tool 41 shown in Fig. 4. Below the eye or loop 38, the front wall 36 is provided with an inwardly extending depression or groove 42, thus permitting this end wall 36 to bend inwardly a slight amount when the hook 40 of tool 41 is placed in the eye or loop 38 and pulled so as to permit the edge of the cutaway 37 to clear the heads 26 of the food basket supporting pins 27 and permit the strainer basket 30 to be removed for cleaning when necessary.

The strainer basket 30 as thus far described will be made of any suitable metal such as stainless steel, aluminum or aluminum alloys, copper or copper alloys which have sufficient strength so that the outwardly extending flanges 35 will support the weight thereof and of the food basket 21 and the contained food and yet will be sufficiently flexible to permit its removal as described. Supported on the inwardly extending bottom flanges 34 is a wire strainer mesh 43. This strainer mesh is preferably made of copper wire or other suitable material having a mesh of (80 x 70), commonly known as 80-mesh copper wire, the wire strainer itself having a gage of .0055. This particular gage and mesh have been found most suitable for permitting ready circulation of the heated cooking fat or oil therethrough, yet at the same time it completely prevents the passage of any food particles, crumbs or the like therethrough.

This mesh 43 may be permanently secured to the flanges 34, but it will preferably be permanently secured to a metal frame 44 of the same metal as the side walls 32, and the mesh frame 44 is then removably secured to the supporting flanges 34 by means of studs 45. By thus providing the mesh 43 with a frame 44 removably secured, it is possible to replace the strainer mesh should the same be accidently damaged without the necessity of replacing the entire strainer basket.

Midway of the opposite side walls 32 and about half way up their height, each side wall is provided with a hole 46 over which is permanently secured a wire mesh 47 identical with the mesh at 43.

In Fig. 5 there is shown a grid 31 consisting of a pair of spaced apart longitudinally extending rods 50 and three transversely extending rods 51 permanently welded or otherwise secured across the tops of the rods 50, the length of the longitudinal and transverse rods 50 and 51 being such that when placed within the strainer basket 50, their ends will rest on the mesh frame 44 or if no frame be present then on the supporting flanges 34. This grid 31 prevents the weight of the food basket 21 from resting on the mesh 43, and instead the bottom ribs 23 of the food basket 21 rest on the transverse rods 51 of the grid 31 and thus transfer the weight of the food basket 21 and its contained food directly or indirectly to the supporting flange 34 at the bottom of the strainer basket 30.

In operation, the strainer basket 30 of this invention is made of a suitable shape and size to fit within the well of any deep fat frying apparatus here shown as a home kitchen style portable deep fat frying apparatus 10. If the food fryer basket 21 has a depending leg portion from the bottom of the ribs 23, such depending leg portion, customary only at one end, may be cut away by a hack saw if present. The strainer basket 30 is then placed within the well 11 and supported by its top edge flanges 35. The removable grid 31 is placed over the mesh 43 to protect it, and then the frying apparatus 10 is used in its customary manner, putting in the usual frying fat or grease after the basket 30 is in place. The food to be fried is placed in the food basket 21 which is lowered within the well 11 and strainer basket 30 and operated in the customary manner. The heat from the electrical elements heats the frying oil or fat which circulates through the food in the food basket 21, circulating freely through the wire mesh 43, the holes 46 and mesh 47 in the side walls preventing any spattering and permitting ready circulation of the oil through such side walls. When the food in the basket 21 is properly fried, the basket 21 is lifted by means of handle 24 and supported in its customary manner on the supporting pins 27 allowing the oil or grease to drain therefrom back into the well.

Then when the frying operation is completed for the day, the oil is drained by means of its drain pipe 14 and spout 15 from the well 11 to a suitable storage container. As the oil is drained out of the well, it must pass through either mesh 47 or strainer mesh 43 and no food particles whatsoever will be able to pass through either of these strainer meshs. Likewise during the frying operation, the oil or fat circulates freely through the mesh carrying the heat from the walls of the inner well 11 to the food in basket 21, but cannot carry any food particles through the wire mesh 43 or 47, thus preventing the food particles from remaining in the oil to be drained therewith, and also preventing any food particles from making direct contact with the heated wall of the inner well 11 to possibly break down into burnt contaminating particles.

After the oil has been drained from the well 11, the tool 41 may be used by placing its hook 40 in the eye or loop 38 to release the strainer basket 30 below the supporting pins 26 permitting the same to be removed and cleaned separately.

As used in the home kitchen, one or more batches of food may be cooked at one time and then it is customary to drain the oil therefrom.

In operation, it has been found that it is not necessary to strain the cooking oil or fat more than once in about every two hours, and inasmuch as it is seldom necessary to use the apparatus 10 as much as two hours continuously, the cooking fat or oil will remain continuously free from contamination and after being used for one type of food and drained therefrom it may be used for any other type of food normally fried in an apparatus of this nature without carrying any contamination or cooking tastes, smells or odor from one type of food to any succeeding type of food. Inasmuch as the oil is thus automatically freed of all food particles as it is drained from the well of the apparatus, it remains uncontaminated and lasts four or five times as long as customary while cooking and also is much less apt to deteriorate while stored due to the absence of any contamination therein.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A deep-fat frying device comprising a double-walled housing consisting essentially of an outer shell and an inner shell defining a relatively deep well having substantially imperforate side and bottom walls and an open top end, a conduit extending from the lower side wall portion of said well through said outer shell, a drain means connected to said conduit externally of said outer shell, an internal shoulder provided at the lower side wall portion of said well in spaced relationship to the bottom wall thereof, a relatively deep receptacle in said well, said receptacle having a substantially imperforate side wall area and open top and bottom ends, said open top end of said receptacle being defined by a laterally outwardly extending flange portion, and said open bottom end of said receptacle being defined by a laterally inwardly extending flange portion, a screen supported by said inwardly extending flange portion and closing said open bottom end of said receptacle, said receptacle being supported at the bottom end thereof by the internal shoulder of said well and, at the top end thereof, by said outwardly extending flange portion engaging said housing, spacer bars provided on the internal surface of the screen closing said open bottom end of said receptacle, screened openings in the side wall area of said receptacle, and a relatively deep basket insertable into said receptacle from the open end thereof and adapted to rest on said spacer bars.

2. The device of claim 1 wherein support means extend laterally inward from the upper portion of said well to support said basket in raised position within said well, and wherein a slot is provided at the upper end of a portion of the side wall area of said receptacle to accommodate said support means, and an eyelet positioned on the internal surface of said side wall area below said slot, and eyelet being adapted to be engaged by a hooked tool for lifting said receptacle from said well.

3. The device of claim 2 wherein an internally extending depression is provided in said side wall area in vertically spaced relation to said eyelet.

References Cited in the file of this patent

UNITED STATES PATENTS

| | | |
|---|---|---|
| 523,643 | Pack | July 24, 1894 |
| 567,108 | Meier | Sept. 1, 1896 |
| 1,391,231 | Wilson | Sept. 20, 1921 |
| 1,396,416 | Garrett | Nov. 8, 1921 |
| 1,998,797 | Weinberger | Apr. 23, 1935 |
| 2,000,609 | Pitman | May 7, 1935 |
| 2,071,467 | Kouvallis | Feb. 23, 1937 |
| 2,136,535 | Anetsberger | Nov. 15, 1938 |
| 2,154,391 | Anderson | Apr. 11, 1939 |
| 2,528,776 | Pappas | Nov. 7, 1950 |
| 2,570,628 | Anetsberger | Oct. 9, 1951 |
| 2,635,527 | Overbeck et al. | Apr. 21, 1953 |